(12) United States Patent
Liu et al.

(10) Patent No.: US 11,151,712 B2
(45) Date of Patent: Oct. 19, 2021

(54) METHOD AND APPARATUS FOR DETECTING IMAGE DEFECTS, COMPUTING DEVICE, AND COMPUTER READABLE STORAGE MEDIUM

(71) Applicants: Beijing BOE Optoelectronics Technology Co., Ltd., Beijing (CN); BOE Technology Group Co., Ltd., Beijing (CN)

(72) Inventors: Xiaolei Liu, Beijing (CN); Lili Chen, Beijing (CN); Yunqi Wang, Beijing (CN); Minglei Chu, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 101 days.

(21) Appl. No.: 16/557,422

(22) Filed: Aug. 30, 2019

(65) Prior Publication Data
US 2020/0234420 A1 Jul. 23, 2020

(30) Foreign Application Priority Data
Jan. 17, 2019 (CN) .......................... 201910043838.1

(51) Int. Cl.
*G06T 7/00* (2017.01)
*G06T 5/00* (2006.01)
(Continued)

(52) U.S. Cl.
CPC .............. *G06T 7/001* (2013.01); *G06T 5/005* (2013.01); *G06T 5/20* (2013.01); *G06T 5/50* (2013.01);
(Continued)

(58) Field of Classification Search
CPC .. G06T 5/20; G06T 5/005; G06T 5/50; G06T 7/001; G06T 7/40; G06T 7/90;
(Continued)

(56) References Cited

U.S. PATENT DOCUMENTS

2003/0072470 A1\* 4/2003 Lee .......................... G06T 7/155
382/103
2004/0120602 A1 6/2004 Nakajima et al.
(Continued)

FOREIGN PATENT DOCUMENTS

CN 102509300 B 7/2014
CN 103914687 A 7/2014
(Continued)

OTHER PUBLICATIONS

Chen Lianzheng: "TFT-LCD Based on Image Background Reconstruction and Level Set: Research and Application of Defect Detection Algorithm", 2016, Huazhong University of Science and Technology, Master Thesis, pp. 23-28, 43, 58-64. (Year: 2016).\*
(Continued)

*Primary Examiner* — Chan S Park
*Assistant Examiner* — Claude Noel Y Zanetsie
(74) *Attorney, Agent, or Firm* — Myers Bigel, P.A.

(57) ABSTRACT

A method for detecting image defects is described, which includes obtaining an image to be detected, down-sampling the image to be detected to obtain a down-sampled image, de-cluttering the down-sampled image to obtain a de-cluttered image, restoring the de-cluttered image into a restored image having the same resolution as the image to be detected so as to be used as a background image, and comparing the image to be detected with the background image to determine defects in the image to be detected. An apparatus for detecting image defects, a computing device and a storage medium are also described.

17 Claims, 6 Drawing Sheets

(51) Int. Cl.
  *G06T 5/50* (2006.01)
  *G06T 7/90* (2017.01)
  *G06T 7/40* (2017.01)
  *G06T 5/20* (2006.01)

(52) U.S. Cl.
  CPC ............... *G06T 7/40* (2013.01); *G06T 7/90* (2017.01); *G06T 2207/30121* (2013.01)

(58) Field of Classification Search
  CPC . G06T 2207/30121; G06T 2207/20024; G06T 2207/20182; G06K 9/40; G06K 9/44
  See application file for complete search history.

(56) References Cited

U.S. PATENT DOCUMENTS

| 2008/0008397 | A1* | 1/2008 | Kisilev | G06T 5/30 |
| | | | | 382/275 |
| 2011/0007176 | A1 | 1/2011 | Hamano | |

FOREIGN PATENT DOCUMENTS

| CN | 103124332 B | 1/2016 |
| CN | 105301810 A | 2/2016 |
| CN | 106250895 A | 12/2016 |
| CN | 107194919 A | 9/2017 |

OTHER PUBLICATIONS

Min Yongzhi et al.: "Rail Surface Defects Detection Based on Gray Scale Gradient Characteristics of image," Apr. 2018, Chinese Journal of Scientific Instrument, vol. 39 No. 4, pp. 221-227. (Year: 2018).*

Wu Wei et al.: "Image Enhancement Technology Based on Learning", Feb. 28, 2013, Xidian University of Electronics Technology Press, pp. 34-37. (Year: 2013).*

"First Office Action and English language translation", CN Application No. 201910043838.1, dated Jul. 15, 2020, 19.

Chen, Lianzheng (2016). "TFT-LCD based on image background reconstruction and level set Research and Application of Defect Detection Algorithm", China Master's Theses Full-text Database (CMFD) Information Science and Technology, vol. 1, 2018, Jan. 2018 (39 pp. with English language translation).

Liu, Hongli , et al., "Sensing and detection technology", National Defense Industry Press, Edition 1, China, Jun. 2007 (7 pp. with English language translation).

Min, Yongzhi , et al., "Rail surface defects detection based on gray scale gradient Characteristics of image", Chinese Journal of Scientific Instrument, vol. 39, No. 4, Apr. 2018, 220-229 (25 pp with English language translation).

Wu, Wei , et al., "Image enhancement technology based on learning", Xidian University Press, Edition 1, Feb. 2013, 34-37 (15 pp. with English language translation).

* cited by examiner

METHOD AND APPARATUS FOR DETECTING IMAGE DEFECTS, COMPUTING DEVICE, AND COMPUTER READABLE STORAGE MEDIUM

RELATED APPLICATION

The present application claims the priority of Chinese Patent Application No. 201910043838.1 filed on Jan. 17, 2019, the entire disclosure of which is incorporated herein by reference.

TECHNICAL FIELD

The present disclosure relates to the technical field of image processing, and in particular, to a method and an apparatus for detecting image defects, a computing device and a computer readable storage medium.

BACKGROUND

During manufacturing of LCD screens, various defects are often produced. These defects need to be detected automatically on the factory production line and before the screens leave the factory, so as to locate the positions of the defects on the screens for further manual analysis and inspection.

When detecting defects of a screen, an industrial camera is usually used to take an image of the screen, and the defects of the screen are determined by detecting defects on the image of the screen. However, because the screen position on the screen inspection pipeline is not completely fixed every time, the relative position relationship between the industrial camera and the screen is always changing, and because every time the camera is exposed, the body thereof shakes, and the surrounding people and objects cause changes in the ambient light, it is impossible to obtain "standard images" that are completely accurate and consistent and that do not include any defect, thus it is difficult to determine the defects on the image taken.

The method commonly used at present to obtain the "standard image" (i.e., background image without defects) is transforming the image into the frequency domain for processing and then restoring the image to the time domain, the method can achieve the objects of removing defects and extracting background by weakening the high frequency parts of the image in the frequency domain. However, said method is generally inefficient because the image is first subjected to the Fourier transformation and then to the inverse Fourier transformation after being processed. Especially, as the screen resolution and data volume increase, said method cannot provide real-time detection.

SUMMARY

In view of the above, the present disclosure provides a method and an apparatus for detecting image defects, a computing device and a storage medium, so as to improve the efficiency of detecting image defects to a certain extent.

According to a first aspect of the present disclosure, a method for detecting image defects is provided, which comprises:

obtaining an image to be detected;

down-sampling the image to be detected to obtain a down-sampled image;

de-cluttering the down-sampled image to obtain a de-cluttered image;

restoring the de-cluttered image into a restored image having the same resolution as the image to be detected so as to be used as a background image;

comparing the image to be detected with the background image to determine defects in the image to be detected.

Alternatively, down-sampling the image to be detected comprises:

dividing the image to be detected into a number of sub-images;

calculating a gray-value-based texture entropy for each sub-image;

for each sub-image whose value of texture entropy is greater than or equal to a texture entropy threshold, using a mean of gray values of said sub-image as a sampling value for down-sampling;

for each sub-image whose value of texture entropy is smaller than the texture entropy threshold, using a center point value of the gray values of said sub-image as the sampling value for down-sampling.

Alternatively, de-cluttering the down-sampled image comprises:

mean-filtering the down-sampled image; and

Gauss-filtering the mean-filtered image.

Alternatively, restoring the de-cluttered image into a restored image having the same resolution as the image to be detected comprises:

performing cubic convolution on the de-cluttered image to obtain the restored image having the same resolution as the image to be detected.

Alternatively, a convolution kernel of the cubic convolution uses the following piecewise function:

$$u(s) = \begin{cases} (a+2)|s|^3 - (a+3)|s|^2 + 1 & 0 < |s| < 1 \\ a|s|^3 - 5a|s|^2 + 8a|s| - 4a & 1 < |s| < 2 \\ 0 & 2 < |s| \end{cases}$$

wherein, $|s|$ is a distance between a pixel point to be inserted and a known pixel point among a plurality of known pixel points among which the pixel point to be inserted is to inserted, $u(s)$ is a coefficient of the cubic convolution algorithm, $a$ is a non-zero constant, and a spacing between adjacent known pixel points is set to 1.

Alternatively, comparing the image to be detected with the background image to determine defects in the image to be detected comprises:

for a pixel point at each position on the image to be detected:

in response to determining that a gray value of the pixel point at said position is greater than a sum of a gray value of the pixel point at the corresponding position of the background image and a first difference threshold, determining said pixel point to be a first defect which is a bright spot.

Alternatively, comparing the image to be detected with the background image to determine defects in the image to be detected comprises:

for a pixel point at each position on the image to be detected:

in response to determining that a gray value of the pixel point at said position is smaller than a difference between a gray value of the pixel point at the corresponding position of the background image and a second difference threshold, determining said pixel point to be a second defect which is a dark spot.

Alternatively, the first difference threshold is a preset percentage of the gray values of the pixel points at the corresponding position.

Alternatively, the second difference threshold may be equal to the first difference threshold.

According to a second aspect of the present disclosure, an apparatus for detecting image defects is provided, which comprises:

an obtaining circuit configured to obtain an image to be detected;

a down-sampling circuit configured to down-sample the image to be detected to obtain a down-sampled image;

a de-cluttering circuit configured to de-clutter the down-sampled image to obtain a de-cluttered image;

a restoring circuit configured to restore the de-cluttered image into a restored image having the same resolution as the image to be detected so as to be used as a background image;

a comparing circuit configured to compare the image to be detected with the background image to determine defects in the image to be detected.

Alternatively, the down-sampling circuit is configured to:

divide the image to be detected into a number of sub-images;

calculate a gray-value-based texture entropy for each sub-image;

for each sub-image whose value of texture entropy is greater than or equal to a texture entropy threshold, use a mean of gray values of said sub-image as a sampling value for down-sampling;

for each sub-image whose value of texture entropy is smaller than the texture entropy threshold, use a center point value of the gray values of said sub-image as the sampling value for down-sampling.

Alternatively, the de-cluttering circuit is configured to:

perform mean-filtering on the down-sampled image; and perform Gauss-filtering on the mean-filtered image.

Alternatively, the restoring circuit is configured to:

perform cubic convolution on the de-cluttered image to obtain the restored image having the same resolution as the image to be detected.

Alternatively, the convolution kernel of the cubic convolution includes the following piecewise function:

$$u(s) = \begin{cases} (a+2)|s|^3 - (a+3)|s|^2 + 1 & 0 < |s| < 1 \\ a|s|^3 - 5a|s|^2 + 8a|s| - 4a & 1 < |s| < 2 \\ 0 & 2 < |s| \end{cases}$$

wherein, $|s|$ is a distance between a pixel point to be inserted and a known pixel point among a plurality of known pixel points among which the pixel point to be inserted is to inserted, u(s) is a coefficient of the cubic convolution algorithm, a is a non-zero constant, and a spacing between adjacent known pixel points is set to 1.

Alternatively, the comparing circuit is configured to:

for a pixel point at each position on the image to be detected:

in response to determining that a gray value of the pixel point at said position is greater than a sum of a gray value of the pixel point at the corresponding position of the background image and a first difference threshold, determine said pixel point to be a first defect which is a bright spot.

Alternatively, the comparing circuit is configured to:

for a pixel point at each position on the image to be detected:

in response to determining that a gray value of the pixel point at said position is smaller than a difference between a gray value of the pixel point at the corresponding position of the background image and a second difference threshold, determine said pixel point to be a second defect which is a dark spot.

According to a third aspect of the present disclosure, a computing device is provided, which comprises:

at least one processor; and a memory configured to store computer executable instructions which, when being executed by the at least one processor, enable said at least one processor to carry out any one of the above-mentioned methods.

According to a fourth aspect of the present disclosure, a computer readable storage medium storing computer executable instructions is provided, when the computer executable instructions are executed by a processor, any one of the above-mentioned methods is carried out.

BRIEF DESCRIPTION OF THE DRAWINGS

In order to more clearly illustrate the technical solutions of the embodiments of the present disclosure, the accompanying drawings of the embodiments will be briefly described below. Obviously, the drawings described below relate only to some embodiments of the present disclosure, but they do not mean to limit the present disclosure.

DETAILED DESCRIPTION OF EMBODIMENTS

In order to make the object, technical solutions and advantages of the embodiments of the present disclosure clearer, the embodiments of the present disclosure will be described clearly and completely in conjunction with the accompanying drawings. Obviously, the described embodiments are only some, instead of all, of the embodiments of the present disclosure. Based on the described embodiments of the present disclosure, it is easy for those skilled in the art to think of all other embodiments that fall within the scope of protection of the present disclosure.

Unless otherwise defined, the technical or scientific terms used in this disclosure shall be of the general meaning to those with general skills in the field to which the disclosure belongs. The words "first", "second" and the like used in this disclosure do not indicate any order, quantity or importance, but they are used to distinguish different components. Similarly, words such as "one", "a" and "said" do not indicate quantitative restrictions, but rather the existence of at least one. The wording such as "include" or "comprise" indicates that the component or object before said wording contains the elements or objects listed after said wording and their equivalents without excluding other elements or objects. The wording like "connected to" or "coupled to" is not limited to physical or mechanical connection, but it may also include electrical connection, either direct or indirect. The words "above", "under", "left", "right" and so on are only used to represent relative positional relationships, and when the absolute position of the described object changes, the relative positional relationship may also change accordingly.

Figure 1:
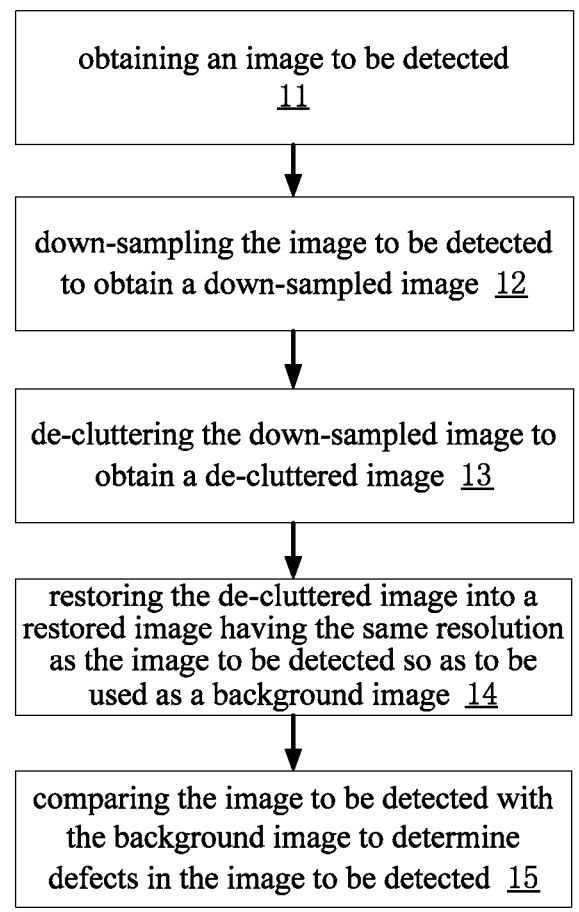
FIG. 1 is a schematic flow chart of a method for detecting image defects provided in an embodiment of the present disclosure.

FIG. 1 illustrates a schematic flow chart of a method for detecting image defects according to an embodiment of the present disclosure. Said method for detecting image defects can improve the efficiency of detecting image defects to a certain extent. As shown in FIG. 1, said method for detecting image defects includes the following steps 11-15.

Figure 5A:
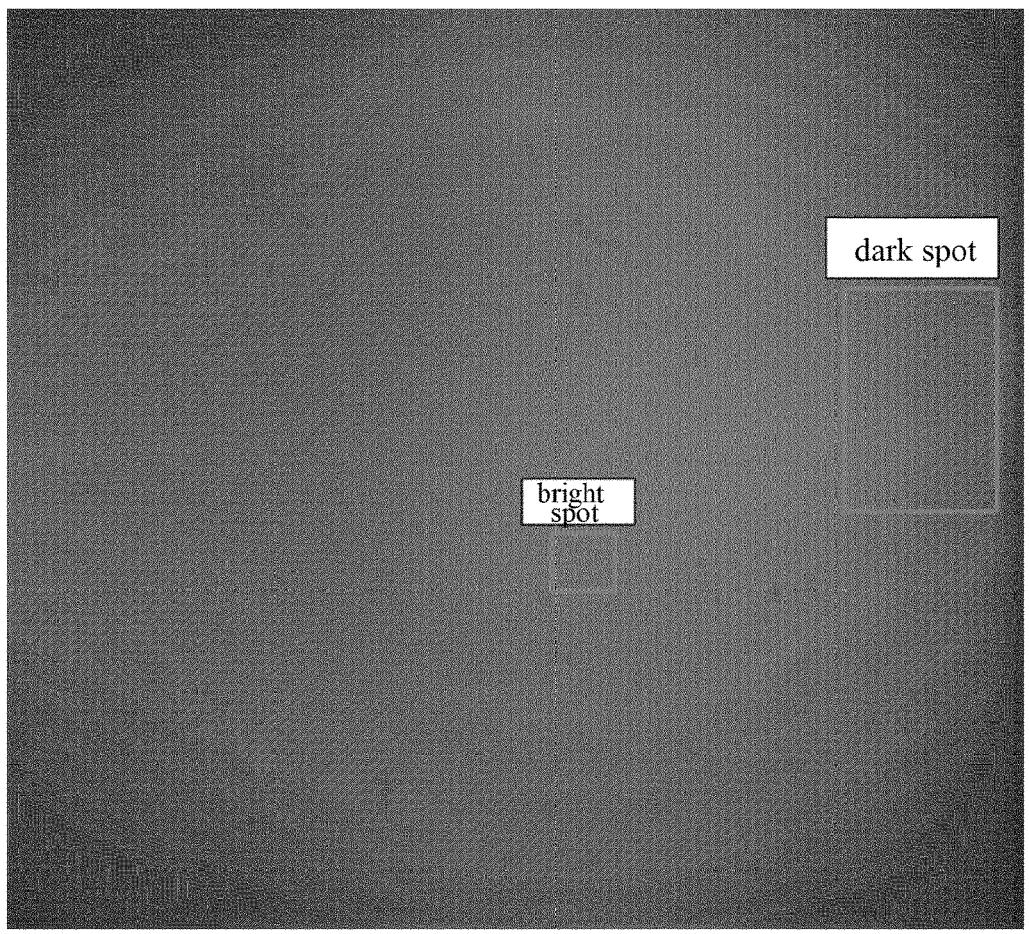
FIG. 5A is a schematic diagram of an image to be detected in an embodiment of the present disclosure.
Figure 5B:
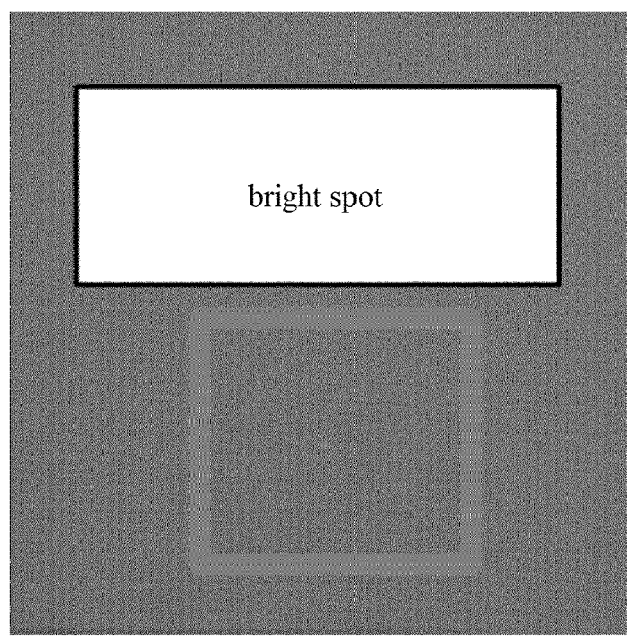
FIG. 5B is an enlarged schematic diagram of a bright spot position on an image to be detected in an embodiment of the present disclosure.
Figure 5C:
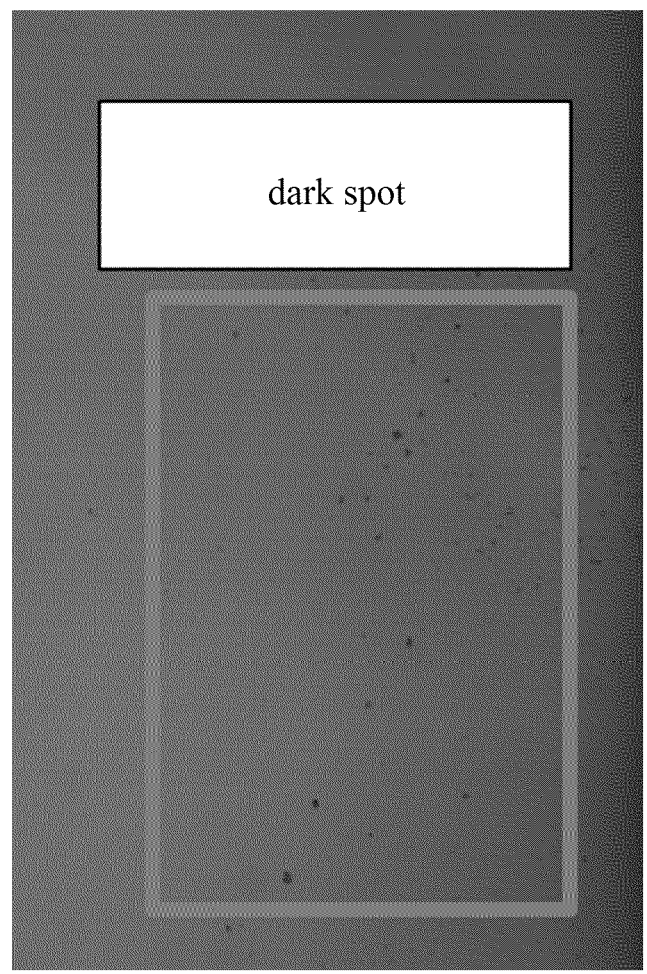
FIG. 5C is an enlarged schematic diagram of a dark spot position on an image to be detected in an embodiment of the present disclosure.

In step 11, an image to be detected is obtained. As an example, said image to be detected can be a screen image of a display panel taken by an industrial camera, and said screen image is an image taken when the display panel is lit. FIG. 5A-5C show screen images with defects of a display panel taken by an industrial camera. It should be noted that the images here are merely illustrative and they do not mean that the images to be detected must have defects. Of course, if the method for detecting image defects provided in the embodiment of the present disclosure is used to detect screen images without defects, then no defect can be detected, which also means that the detection result is zero defect.

In step 12, the image to be detected is down-sampled to obtain a down-sampled image.

Figure 2:
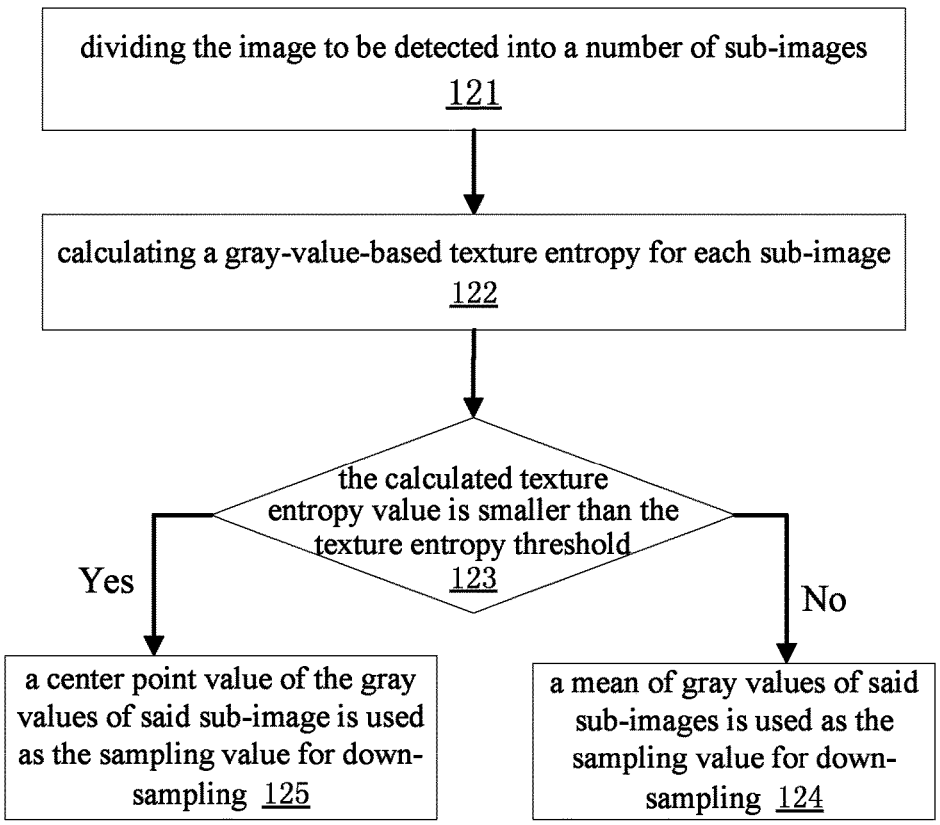
FIG. 2 is a schematic flow chart of down-sampling the image to be detected in an embodiment of the present disclosure.

In some embodiments, as shown in FIG. 2, down-sampling the image to be detected may include the following steps 121-125.

In step 121, the image to be detected is divided into a number of sub-images.

For example, assuming the image to be detected has a resolution of M×N=1600×1440 pixels, then the image to be detected can be divided into 100×90 sub-images with a resolution of m×n=16×16 pixels.

In step 122, a gray-value-based texture entropy is calculated for each sub-image.

For example, the texture entropy of each sub-image can be calculated according to the following equation:

$$H = \Sigma_{i=0}^{N} - p_i \ln p_i$$

wherein, N=256, $p_i$ is a probability of occurrence of pixels of the $i^{th}$ level among 256 gray levels.

In step 123, it is determine whether the calculated texture entropy value is smaller than a texture entropy threshold. The texture entropy threshold can be set as desired.

In step 124, in response to determining that the calculated texture entropy value is not smaller than (i.e. is greater than or equal to) the texture entropy threshold, a mean of the gray values of the sub-image is used as a sampling value for down-sampling. The calculated texture entropy value being not smaller than the texture entropy threshold means that the sub-image includes a lot of information, so in this case, it is advantageous to use the mean of the gray values of all pixel points of the sub-image as the sampling value for down-sampling. Alternatively, the mean of the gray values is a sum of all gray values divided by the number of pixel points.

In step 125, in response to determining that the calculated texture entropy value is smaller than the texture entropy threshold, a center point value of the gray value of said sub-image is used as the sampling value for down-sampling. The calculated texture entropy value being smaller than the texture entropy threshold means that the sub-image includes little information, so in this case, it is advantageous to use the center point value among the gray values of all pixel points of said sub-image as the sampling value for down-sampling. Alternatively, the center point value among the gray values of said sub-image can be determined by sorting the gray values of all the pixels by size and using the gray value at the center of the sequence as the center point value.

By means of the image down-sampling method, not only the amount of image data to be processed is greatly reduced, but also the process of determining image defects is significantly speeded up.

It should be noted that the method of determining the sampling value based on the texture entropy here is only an exemplary embodiment of the present disclosure. It shall be understood that any method for determining the sampling value for down-sampling may be used, such as determining the sampling value by down-sampling according to a preset sampling coefficient, determining the sampling value by determining the sampling coefficient according to the resolution of the image to be down-sampled, and so on.

In step 13, the down-sampled image is de-cluttered to obtain a de-cluttered image. In some embodiments, mean filtering and/or Gauss filtering, etc. can be used for de-cluttering images, which is not restrictive. In addition, the use of median filtering, bilateral filtering and other image filtering methods for de-cluttering images is also considered.

Alternatively, the down-sampled image can be de-cluttered by subjecting the down-sampled image first to the mean filtering and then to the Gauss filtering. The de-cluttered image obtained in this way can be smoother and the effect of de-cluttering is better.

Figure 3:
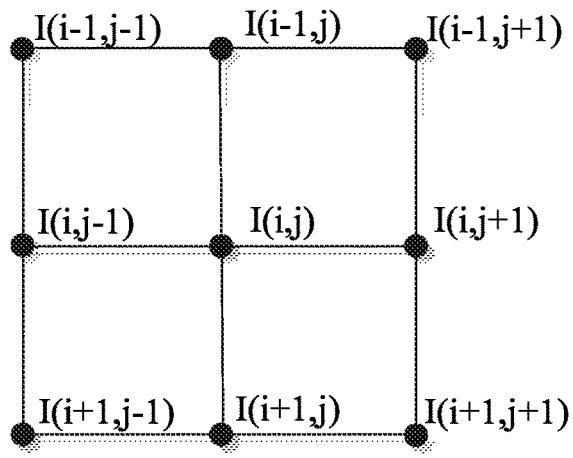
FIG. 3 is a schematic diagram of an image before de-cluttering in an embodiment of the present disclosure.

Specifically, it is assumed that the down-sampled image (i.e., the image before filtering) is as shown in FIG. 3, where the specific steps of Gauss filtering are as follows:

let the coefficient of the Gauss kernel function be $$\frac{1}{16}\begin{bmatrix} 1 & 2 & 1 \\ 2 & 4 & 2 \\ 1 & 2 & 1 \end{bmatrix},$$

and when filtering, a pixel value I of the image in the time domain is directly used for convoluting, and the new pixel value $I_{new}(i,j) = (I(i,j)*1+I(i-1,j)*2+I(i-1,j+1)*1+I(i,j-1)*2+ I(i,j)*4+I(i,j+1)*2+I(i+1,j-1)*1+I(i+1,j)*2+I(i+1,j+1)*1)/$ 16 of the pixel point (i, j) is obtained by calculation, i and j representing coordinates of pixel point (i, j).

Figure 5D:
FIG. 5D is a schematic diagram of an extracted background image in an embodiment of the present disclosure.

In step 14, the de-cluttered image is restored into a restored image having the same resolution as the image to be detected so as to be used as the background image, as shown in FIG. 5D.

In some embodiments, restoring the de-cluttered image into a restored image having the same resolution as the image to be detected may comprise: performing cubic convolution on the de-cluttered image to restore the de-cluttered image into the restored image having the same resolution as the image to be detected.

In some embodiments, when performing cubic convolution on the de-cluttered image, the convolution kernel may adopt the following piecewise function:

$$u(s) = \begin{cases} (a+2)|s|^3 - (a+3)|s|^2 + 1 & 0 < |s| < 1 \\ a|s|^3 - 5a|s|^2 + 8a|s| - 4a & 1 < |s| < 2 \\ 0 & 2 < |s| \end{cases} \quad (1)$$

wherein, |s| is a distance between a pixel point to be inserted and a known pixel point among a plurality of known pixel points among which the pixel point to be inserted is to inserted, u(s) is a coefficient of the cubic convolution algorithm, a is a non-zero constant and can, for example, be 1.6, and the spacing between adjacent known pixel points is set to 1.

Figure 4:
FIG. 4 is a schematic diagram of positional relations among pixel points during restoring of the image in an embodiment of the present disclosure.

For example, as shown in FIG. 4, the known pixel points in the figure are (i, j−1), (i, j), (i, j+1), (i, j+2), which are in the same direction of an array of image pixel points (e.g., on the same row or same column) and have gray values of s(i, j−1), s(i, j), s(i, j+1), s(i, j+2), respectively; the pixel point (u,v) to be inserted is also in the same direction as the known pixel points;

when the distances between the pixel point (u,v) to be inserted and the known pixel points are less than 1, the first term (i.e., $(a+2)|s|^3-(a+3)|s|^2+1$) of the piecewise function (1) is used as the coefficient of the cubic convolution algorithm;

when the distances between the pixel point (u,v) to be inserted and the known pixel points are all greater than 1 and less than 2, the second term (i.e., $a|s|^3-5a|s|^2+8a|s|-4a$) of the piecewise function (1) is used as the coefficient of the convolution algorithm;

as for other known pixel points with a distance greater than 2 from the pixel point to be inserted, they will not be considered.

For example, as shown in FIG. 4, if the gray value of the known pixel point is known, the gray value of the pixel point to be inserted can be calculated as follows:

assuming that the distance between every two known pixel points is 1, the distances between pixel points (i,j) and (i,j+1) and the pixel point to be inserted are less than 1, then the first term of the above piecewise function (1) is used as the coefficient of convolution calculation; however, the distances between pixel point (i,j−1) and the pixel point (i,j+2) and the pixel point to be inserted are greater than 1 but less than 2, then the second term in the piecewise function (1) is used as the coefficient of the convolution algorithm; while other known pixel points whose distances are more than two from the pixel point to be inserted will not considered. In this way, the gray value of the pixel point to be inserted is obtained as:

$$s(u,v)=((a+2)|s|3-(a+3)|s|2+1)\times(s(i,j)+s(i,j+1))+ (a|s|3-5a|s|2+8a|s|-4a)\times(s(i,j-1)+s(i,j+2)).$$

It shall be noted that the aforementioned distance 1 between pixel points is not an actual distance, but a fictitious unit distance, and the actual distance may not be 1.

As an example, when restoring the de-cluttered image, a preliminary restoration can be performed in a row direction of the pixel array of the de-cluttered image, and then a secondary restoration is performed in a column direction of the pixel array of the preliminarily restored image, thus obtaining the above-mentioned restored image. This is not restrictive, of course, and any way or order of restoring images is considered.

In this way, the effect of background extraction is excellent because of the down-sampling, de-cluttering and convolution restoration mentioned above. In addition, experimental data prove that by using the convolution kernel selected in the above-mentioned steps for convolution restoration, the effect of background extraction is excellent.

The main object of restoring image by cubic convolution mentioned in the embodiments of the present disclosure is to reconstruct the down-sampled image so as to further smooth the image while restoring the spatial resolution of the original image.

It should be noted that the aforementioned method of restoring image by cubic convolution is only one of the embodiments of the present disclosure. It can be seen that in addition to cubic convolution, nearest neighbor interpolation, bilinear interpolation and so on can also be used for image restoration.

Figure 5E:
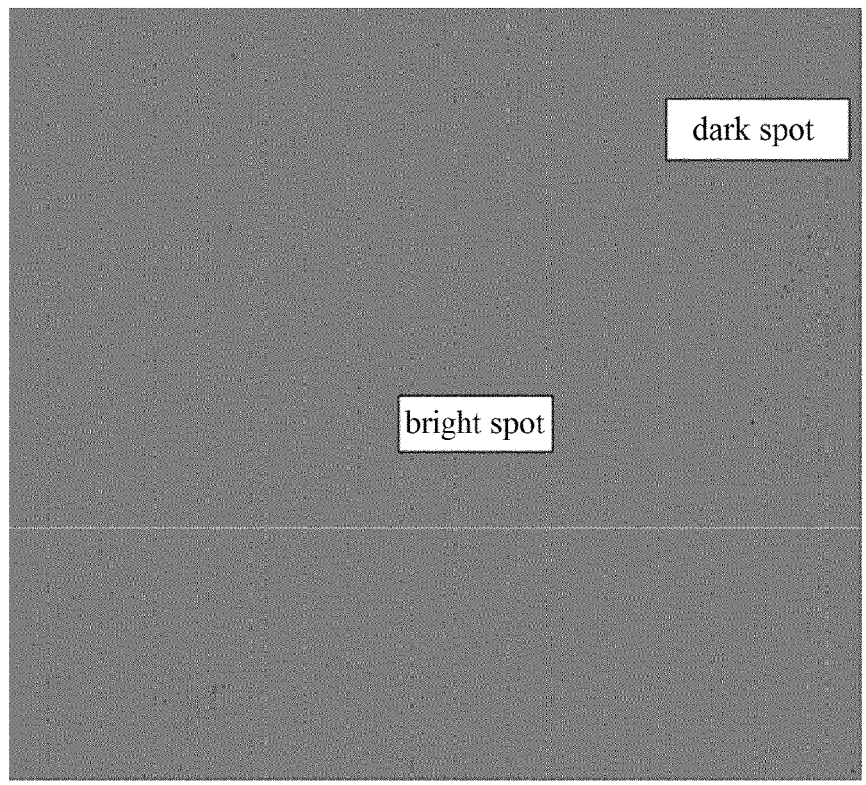
FIG. 5E is a schematic diagram of the result of defect detection in an embodiment of the present disclosure.

In step 15, defects of the image to be detected are determined by comparing the image to be detected with the background image. FIG. 5E is a schematic diagram of the result of such defect detection.

In some embodiments, comparing the image to be detected with the background image to determine defects in the image to be detected may comprise:

for a pixel point at each position on the image to be detected:

in response to determining that a gray value of the pixel point at said position is greater than a sum of a gray value of the pixel point at the corresponding position of the background image and a first difference threshold, determining said pixel point to be a defect. The defect is a bright spot, for example.

In some embodiments, comparing the image to be detected with the background image to determine defects in the image to be detected may comprise:

for a pixel point at each position on the image to be detected:

in response to determining that a gray value of the pixel point at said position is smaller than a difference between a gray value of the pixel point at the corresponding position of the background image and a second difference threshold, determining said pixel point to be a defect. The defect is a dark spot, for example.

Alternatively, in response to determining that the gray value of the pixel point at said position is smaller than or equal to the sum of the gray value of pixel point at the corresponding position of the background image and the first difference threshold, and greater than or equal to the difference between the gray value of the pixel point at the corresponding position of the background image and the second difference threshold, said pixel point is determined to be a normal pixel point.

It shall be noted that the first difference threshold and the second difference threshold may be equal. As an example, the original image to be detected can be subjected to a threshold segmentation. Specifically, the first difference threshold and the second difference threshold are respectively set to n % (n being greater than 0 and less than 100) of the gray value of the pixel point at the corresponding position of the background image, and pixel points at the same position are compared. Suppose that the gray value of the pixel point of the original image is p, the gray value of the pixel point at the corresponding position of the background image is v, then if p>v×(1+n %), said pixel point is the defect and is the bright spot; and/or if p<v×(1−n %), said pixel point is the defect and is the dark spot; and/or if neither of the above conditions is satisfied, the pixel point is a normal pixel point.

The method for detecting image defects provided in the embodiments of the present disclosure effectively combines a series of special image processing methods so as to effectively extract the background of the image containing defects and then detect the defects on the screen. The method for detecting image defects provided in embodiments of the present disclosure obtains defect-free background images by the steps of down-sampling, de-cluttering and image restoration, and then identifies defects in the image (i.e., screen defects) by comparing the background image with the image to be detected. In the embodiments of the present disclosure, the processing step only processes images in the time domain, and no frequency domain transformation is needed for image processing, so the processing is fast enough to realize real-time detection, and the detection result is more accurate. In addition, the method for detecting image defects provided in the embodiments of the present disclosure completely performs image processing in the time domain for background extraction, which can quickly extract the background of the image with screen defects, remove the defects in the image and preserve the bright and dark background completely, thus providing an accurate basis for the subsequent threshold segmentation. The method in the embodiments of the present disclosure can acquire a smoother and cleaner background image by the down-sampling and de-cluttering, and after down-sampling, an accurate background image can be obtained by filtering.

The method for extracting background in the embodiment of the present disclosure is highly efficient, and the time for extracting one background is only 64.83 ms (Pentium CPU, 8 GB RAM), which makes it possible to extract backgrounds online in real time. The real-time background extraction method can minimize the impact of ambient light on the camera, and provide a more accurate "standard brightness" for subsequent detection of bright and dark spots.

The embodiment of the present disclosure detects screen defects on the basis of background extraction. After verification, the method in the embodiments of the present disclosure can extract the background of an image with uneven illumination distribution, and can finally determine the defects based on threshold segmentation.

An embodiment of the present disclosure also provides an apparatus for detecting image defects 20, which can improve the efficiency of image defect detection to a certain extent.

Figure 6:
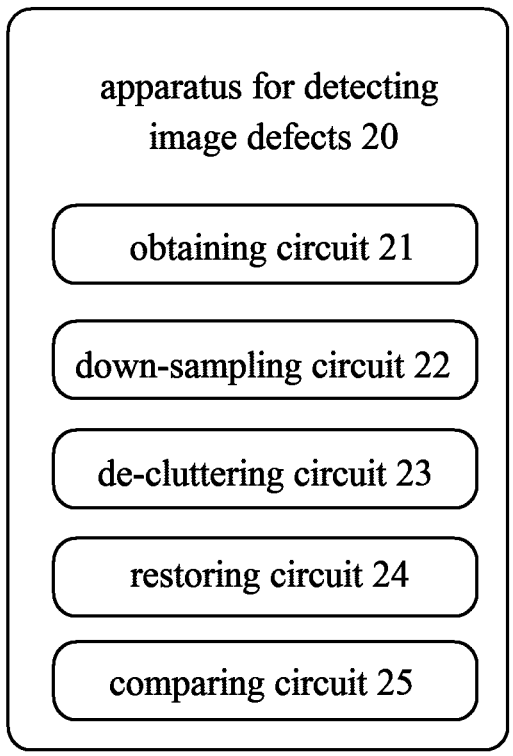
FIG. 6 is a block diagram of an apparatus for detecting image defects provided in an embodiment of the present disclosure.

As shown in FIG. 6, the apparatus for detecting image defects comprises:

an obtaining circuit 21 configured to obtain an image to be detected;

a down-sampling circuit 22 configured to down-sample the image to be detected to obtain a down-sampled image;

a de-cluttering circuit 23 configured to de-clutter the down-sampled image to obtain a de-cluttered image;

a restoring circuit 24 configured to restore the de-cluttered image into a restored image having the same resolution as the image to be detected so as to be used as a background image;

a comparing circuit 25 configured to compare the image to be detected with the background image to determine defects in the image to be detected.

It should be pointed out that each of the obtaining circuit 21, down-sampling circuit 22, de-cluttering circuit 23, restoring circuit 24 and comparing circuit 25 described above can be implemented as one of the hardware elements with data processing capability such as a processor, an integrated circuit, an system-on-a-chip (Soc), an application specific integrated circuit (ASIC), a field programmable gate array (FPGA), and a complex programmable logic device (CPLD) or be implemented as corresponding software instruction or module.

The apparatus for detecting image defects provided in the embodiment of the present disclosure obtains the background image without defects through the steps of down-sampling, de-cluttering and image restoration, and then identifies the defects on the screen by comparing the background image with the image to be detected. In the technical solution of the present disclosure, images are only processed in the time domain without the need to perform frequency domain transformation, so the processing is fast and the result of defect detection is more accurate. Meanwhile, the apparatus for detecting image defects provided in the embodiment of the present disclosure processes the image entirely in the time domain to extract the background, so that the background of the image with screen defects can be quickly extracted, and the defects in the image can be removed and the bright and dark background can be completely preserved, thereby providing an accurate basis for subsequent threshold segmentation.

In some embodiments, the down-sampling circuit 22 is configured to divide the image to be detected into a number of sub-images;

calculate the gray-value-based texture entropy for each sub-image;

for each sub-image whose value of texture entropy is greater than or equal to a texture entropy threshold, use a mean of gray values of said sub-image as a sampling value for down-sampling;

for each sub-image whose value of texture entropy is smaller than the texture entropy threshold, use a center point value of the gray values of said sub-image as the sampling value for down-sampling.

Thus, by carrying out an effective image down-sampling method before filtering, not only the amount of the image data to be processed is greatly reduced, but also the process of determining image defects is significantly speeded up.

In some embodiments, the de-cluttering circuit 23 is configured to perform mean-filtering on the down-sampled image; and perform Gauss-filtering on the mean-filtered image.

In some embodiments, the restoring circuit 24 is configured to perform cubic convolution on the de-cluttered image to obtain the restored image having the same resolution as the image to be detected.

The main object of restoring image by cubic convolution mentioned in the embodiments of the present disclosure is to reconstruct the down-sampled image so as to further smooth the image while restoring the spatial resolution of the original image.

In some embodiments, the convolution kernel of the cubic convolution in the restoring circuit 24 uses the following piecewise function:

$$u(s) = \begin{cases} (a+2)|s|^3 - (a+3)|s|^2 + 1 & 0 < |s| < 1 \\ a|s|^3 - 5a|s|^2 + 8a|s| - 4a & 1 < |s| < 2 \\ 0 & 2 < |s| \end{cases}$$

wherein, |s| is a distance between a pixel point to be inserted and a known pixel point among a plurality of known pixel points among which the pixel point to be inserted is to inserted, u(s) is a coefficient of the cubic convolution algorithm, a is a non-zero constant, and a spacing between known adjacent pixels is set to 1.

As an example, when the distance between the pixel point to be inserted and the known pixel point among a plurality of known pixel points is less than 1, the first term of the piecewise function is used as the coefficient of the cubic convolution algorithm;

when the distance between the pixel point to be inserted and the known pixel point among a plurality of known pixel points is greater than 1 and less than 2, the second term of the piecewise function is used as the coefficient of the convolution algorithm;

other known pixel points with a distance greater than 2 from the pixel point to be inserted will not be considered.

In some embodiments, the comparing circuit 25 is configured to for a pixel point at each position on the image to be detected:

in response to determining that a gray value of the pixel point at said position is greater than a sum of a gray value of the pixel point at the corresponding position of the background image and a first difference threshold, determine said pixel point to be a defect. The defect is a bright spot, for example.

In some embodiments, the comparing circuit 25 is configured to:

for a pixel point at each position on the image to be detected:

in response to determining that a gray value of the pixel point at said position is smaller than a difference between a gray value of the pixel point at the corresponding position of the background image and a second difference threshold, determine said pixel point to be a defect. The defect is a dark spot, for example.

In some embodiments, the comparing circuit 25 is configured to:

in response to determining that the gray value of the pixel point at said position is smaller than or equal to the sum of the gray value of pixel point at the corresponding position of the background image and the first difference threshold, and greater than or equal to the difference between the gray value of the pixel point at the corresponding position of the background image and the second difference threshold, determine said pixel point to be a normal pixel point.

Figure 7:
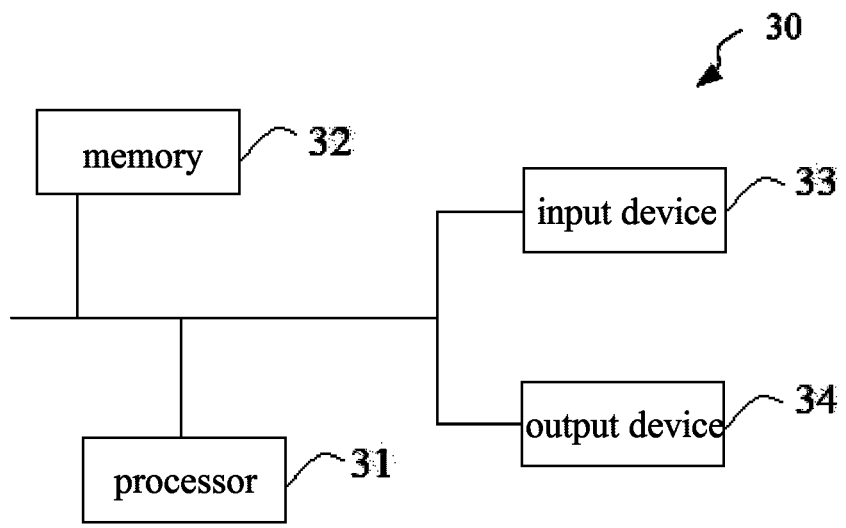
FIG. 7 is a block diagram of an example computing device provided in an embodiment of the present disclosure, which can implement the various techniques described herein.

FIG. 7 illustrates an example computing device 30 which can implement the various techniques described herein. As shown in FIG. 7, the computing device 30 includes one or more processors 31 and a memory 32. For brevity, only one processor 31 is shown in FIG. 7. The computing device 30 can also include an input device 33 and an output device 34.

The processor 31, memory 32, input device 33 and output device 34 can be communicatively coupled together by a bus or other device. The bus may include any one or combinations of different bus structures such as a memory bus or a memory controller, a peripheral bus, a universal serial bus and/or a processor or local bus utilizing any of the various bus architectures. Various other examples, such as control and data lines, are also envisaged.

The processor 31 may consist of (multiple) semiconductors and/or transistors (e.g., electronic integrated circuits (IC)).

The memory 32 may be, for example, a computer readable storage medium. The memory 32 may include volatile medium (such as random access memory (RAM)) and/or non-volatile medium (such as read-only memory (ROM), flash memory, compact disc, magnetic disc, etc.). The memory 32 may include fixed medium (e.g., RAM, ROM, fixed hard disc drive, etc.) and movable medium (e.g., flash memory, removable hard disc drive, optical disc, etc.). As a non-volatile computer readable storage medium, the memory 32 can be used to store computer instructions/modules, such as computer instructions/modules corresponding to the method for detecting image defects described in the embodiments of this application. For example, the obtaining circuit 21, the down-sampling circuit 22, the de-cluttering circuit 23, the restoring circuit 24 and the comparing circuit 25 shown in FIG. 6 can be implemented as corresponding computer instructions/modules. The processor 31 implements the method for detecting image defects in the above-described method embodiment by running the computer instructions/modules stored in the memory 32.

The input device 33 can receive input data (e.g., image data) or character information and generate key signal inputs related to the user setting and functional control of the apparatus for detecting image defects. The output device 34 can be used to present the result of detecting image defects, etc. Examples of the input device include keyboards, cursor control devices (e.g., mouse), microphones (e.g., for voice input), scanners, touch functions (e.g., capacitive or other sensors configured to detect physical touches), cameras (e.g., capable of detecting motions that do not involve touch as gestures using visible or invisible wavelengths (such as infrared frequencies)), and so on. Examples of the output device include display devices (e.g., monitors or projectors), speakers, printers, network cards, tactile response devices, etc.

The memory may, for example, be a non-transient computer storage medium that stores computer executable instructions which, when executed by a processor, can execute the method described in any of the above-mentioned method embodiments.

It should be noted that those ordinarily skilled in the art will understand that all or part of the flows in the method described above can be accomplished by relevant hardware instructed by computer programs.

In various embodiments, the computing device 30 may employ various configurations. For example, the computing device 30 can be implemented as a computer-like device including a personal computer, a desktop computer, a multi-screen computer, a laptop computer, a netbook, etc. The computing device 30 can also be implemented as a mobile-device-like equipment including such mobile devices as mobile phones, portable music players, portable game devices, tablets and multi-screen computers. The computing device 30 can also be implemented as a television-like device, including devices with or connected to a generally larger screen in a leisure viewing environment. These devices include televisions, set-top boxes, game consoles, etc.

The techniques described herein can be supported by the various configurations of the computing device 30 and are not limited to the specific examples of the techniques described herein. The functions can also be fully or partially achieved by using distributed systems.

Various technologies are described herein in the general context of software, hardware components or program modules. Generally, these modules include routines, programs, objects, elements, components, data structures that perform specific tasks or implement specific abstract data types. The terms "module", "function" and "component" used herein generally refer to software, firmware, hardware or combinations thereof. The features of the technologies described herein are platform independent, which means that these technologies can be implemented on various computing platforms with various processors.

It will also be apparent to those skilled in the art that the various exemplary logic blocks, modules, circuits and method steps described herein may be implemented as electronic hardware, computer software or a combination of both. In order to clearly illustrate the interchangeability of hardware and software, the functions of various schematic components, blocks, modules, circuits and steps have been described generally. Whether the functions are implemented as software or as hardware depends on the specific application and the design constraints imposed on the whole system. Those skilled in the art may implement the functions in various ways for each specific application, but such implementation should not be interpreted as leading to departure from the scope of the present disclosure.

The various exemplary logic blocks, modules and circuits described herein may utilize the following components designed to achieve the functions described herein: general purpose processors, digital signal processors (DSPs), application specific integrated circuits (ASICs), field programmable gate arrays (FPGAs), or other programmable logic devices, discrete gates or transistor logic, separate hardware components or any combinations of these components. The general purpose processor may be a microprocessor. Alternatively, the processor may be any conventional processor, controller, microcontroller or state machine. The processor can also be implemented as combinations of computing devices, such as a combination of DSP and microprocessor, multiple microprocessors, one or more microprocessors combined with a DSP core, or any other such configurations.

The methods or steps of the methods described herein may be directly included in hardware, in software modules executed by processors, or in combinations of the two. Software modules may reside in RAM memories, flash memories, ROM memories, EPROM memories, EEPROM memories, registers, hard discs, removable discs, CD-ROMs, or any other forms of storage medium known in the art. An exemplary storage medium is coupled to the processor so that the processor can read information from or write information into the storage medium. In an alternative scheme, the storage medium can be integrated with the processor. The processors and storage medium can reside in an ASIC. The ASIC can reside in a user terminal. In an alternative scheme, the processors and storage medium can reside in the user terminal as discrete components.

In one or more example designs, the functions described can be implemented in hardware, software, firmware or any combinations thereof. When implemented in software, the functions can be stored as one or more instructions or codes on a computer readable medium or be transmitted through a computer readable medium. The computer readable medium includes a computer storage medium and a communication medium that includes any medium capable of facilitating transmission of a computer program from one location to another. The storage medium may be any available medium that can be accessed by a general purpose or dedicated computer. As an example, rather than a limitation, the computer readable medium may include RAM, ROM, EEPROM, CD-ROM or other optical disc storage devices, magnetic disc storage devices or other magnetic storage devices, or may be any other medium that can be used to carry or store the needed program codes which appear in the form of instructions or data structures and can be accessed by the general purpose or dedicated computer or general purpose or dedicated processor. In addition, any connection can be appropriately referred to as a computer readable medium. For example, if software is sent from a website, a server or other remote sources using a coaxial cable, an optical fiber cable, a twisted pair, a digital subscriber line (DSL) or wireless technologies such as infrared, radio and microwave, then the above-mentioned coaxial cable, optical fiber cable, twisted pair, DSL or wireless technologies such as infrared, radio and microwave all fall into the definition of medium. As used here, the magnetic discs and optical discs include compact discs (CD), laser discs, optical discs, digital multifunctional discs (DVD), floppy discs and Blu-ray discs, where the magnetic discs usually reproduce data magnetically, while the optical discs reproduce data optically using lasers. Combinations of the above contents should also be included in the scope of computer readable medium.

It should be understood that, for clarity, embodiments of the present disclosure are described with reference to different functional modules. However, it will be obvious that without departing from the present disclosure, the functionality of each functional module can be implemented in a single module, in multiple modules or as part of other functional modules. For example, the functionality described as being implemented by a single module can be implemented by multiple different modules. Therefore, reference to specific functional modules is considered only as reference to appropriate modules for providing the described functionality, rather than indicating strict logical or physical structures or organizations. Therefore, the present disclosure may be implemented in a single module or may be physically and functionally distributed between different modules and circuits.

It will be understood that although the terms first, second and third may be used herein to describe various devices, elements, or components, these devices, elements, or components should not be limited by such terms. These terms are used only to distinguish one device, element or component from another.

Although the present disclosure has been described in conjunction with some embodiments, it is not intended to be limited to the specific forms described herein. On the contrary, the scope of the present disclosure is limited only by the appended claims. Additionally, although individual features may be included in different claims, these features may be advantageously combined, and being included in different claims does not mean that combination of said features is not feasible and/or advantageous. The sequence of the features in the claims does not imply any particular sequence for the features to function. In addition, in the claims, the word "include" does not mean to exclude other elements, and the indefinite article "a" or "an" does not mean to exclude multiple elements. The reference numerals in the claims are provided only as clear examples and should not be construed as limiting the scope of the claims in any way.

The invention claimed is:
1. A method for detecting image defects, comprising:
obtaining an image to be detected;
down-sampling the image to be detected to obtain a down-sampled image;
de-cluttering the down-sampled image to obtain a de-cluttered image;

restoring the de-cluttered image into a restored image having a same resolution as the image to be detected so as to be used as a background image; and comparing the image to be detected with the background image to determine defects in the image to be detected, wherein restoring the de-cluttered image into the restored image having the same resolution as the image to be detected comprises performing cubic convolution on the de-cluttered image to obtain the restored image having the same resolution as the image to be detected.

2. The method according to claim 1, wherein down-sampling the image to be detected comprises:
dividing the image to be detected into a number of sub-images;
calculating a gray-value-based texture entropy for each sub-image;
for each sub-image whose value of texture entropy is greater than or equal to a texture entropy threshold, using a mean of gray values of said sub-image as a sampling value for down-sampling; and
for each sub-image whose value of texture entropy is less than the texture entropy threshold, using a center point value of the gray values of said sub-image as the sampling value for down-sampling.

3. The method according to claim 1, wherein de-cluttering the down-sampled image comprises:
mean-filtering the down-sampled image to obtain a mean-filtered image; and
Gauss-filtering the mean-filtered image.

4. The method according to claim 1, wherein a convolution kernel of the cubic convolution uses the following piecewise function:

$$u(s) = \begin{cases} (a+2)|s|^3 - (a+3)|s|^2 + 1 & 0 < |s| < 1 \\ a|s|^3 - 5a|s|^2 + 8a|s| - 4a & 1 < |s| < 2 \\ 0 & 2 < |s| \end{cases}$$

wherein, |s| is a distance between a pixel point to be inserted and a known pixel point among a plurality of known pixel points among which the pixel point to be inserted is to inserted,
wherein u(s) is a coefficient of the cubic convolution,
wherein a is a non-zero constant, and
wherein a spacing between adjacent known pixel points is set to 1.

5. The method according to claim 1, wherein comparing the image to be detected with the background image to determine defects in the image to be detected comprises:
for a pixel point at each position on the image to be detected, in response to determining that a gray value of the pixel point at said position is greater than a sum of a gray value of the pixel point at a corresponding position of the background image and a first difference threshold, determining said pixel point to be a first defect of the defects in the image.

6. The method according to claim 1, wherein comparing the image to be detected with the background image to determine defects in the image to be detected comprises:
for a pixel point at each position on the image to be detected, in response to determining that a gray value of the pixel point at said position is less than a difference between a gray value of the pixel point at a corresponding position of the background image and a second difference threshold, determining said pixel point to be a second defect of the defects in the image.

7. The method according to claim 5, wherein the first difference threshold is a preset percentage of the gray value of the pixel point at the corresponding position.

8. The method according to claim 6, wherein the second difference threshold is a preset percentage of the gray value of the pixel point at the corresponding position.

9. A computing device, comprising:
at least one processor; and
a memory configured to store computer executable instructions which, when being executed by the at least one processor, enable said at least one processor to carry out the method of claim 1.

10. A non-transitory computer readable storage medium storing computer executable instructions which, when being executed by at least one processor, causes said at least one processor to carry out the method of claim 1.

11. The non-transitory computer readable storage medium according to claim 10, wherein down-sampling the image to be detected comprises:
dividing the image to be detected into a number of sub-images;
calculating a gray-value-based texture entropy for each sub-image;
for each sub-image whose value of texture entropy is greater than or equal to a texture entropy threshold, using a mean of gray values of said sub-image as a sampling value for down-sampling; and
for each sub-image whose value of texture entropy is less than the texture entropy threshold, using a center point value of the gray values of said sub-image as the sampling value for down-sampling.

12. The non-transitory computer readable storage medium according to claim 10, wherein de-cluttering the down-sampled image comprises:
mean-filtering the down-sampled image to obtain a mean-filtered image; and
Gauss-filtering the mean-filtered image.

13. The non-transitory computer readable storage medium according to claim 10, wherein a convolution kernel of the cubic convolution uses the following piecewise function:

$$u(s) = \begin{cases} (a+2)|s|^3 - (a+3)|s|^2 + 1 & 0 < |s| < 1 \\ a|s|^3 - 5a|s|^2 + 8a|s| - 4a & 1 < |s| < 2 \\ 0 & 2 < |s| \end{cases}$$

wherein, |s| is a distance between a pixel point to be inserted and a known pixel point among a plurality of known pixel points among which the pixel point to be inserted is to inserted,
wherein u(s) is a coefficient of the cubic convolution,
wherein a is a non-zero constant, and
wherein a spacing between adjacent known pixel points is set to 1.

14. The non-transitory computer readable storage medium according to claim 10, wherein comparing the image to be detected with the background image to determine defects in the image to be detected comprises:
for a pixel point at each position on the image to be detected, in response to determining that a gray value of the pixel point at said position is greater than a sum of a gray value of the pixel point at a corresponding position of the background image and a first difference threshold, determining said pixel point to be a first defect of the defects in the image.

15. The non-transitory computer readable storage medium according to claim 10, wherein comparing the image to be detected with the background image to determine defects in the image to be detected comprises:

for a pixel point at each position on the image to be detected, in response to determining that a gray value of the pixel point at said position is less than a difference between a gray value of the pixel point at a corresponding position of the background image and a second difference threshold, determining said pixel point to be a second defect of the defects in the image.

16. The non-transitory computer readable storage medium according to claim 14, wherein the first difference threshold is a preset percentage of the gray value of the pixel point at the corresponding position.

17. The non-transitory computer readable storage medium according to claim 15, wherein the second difference threshold is a preset percentage of the gray value of the pixel point at the corresponding position.

* * * * *